US008312453B2

(12) United States Patent
Shah (10) Patent No.: US 8,312,453 B2
(45) Date of Patent: Nov. 13, 2012

(54) MECHANISM FOR COMMUNICATION IN A VIRTUALIZATION SYSTEM VIA MULTIPLE GENERIC CHANNELS OF A PARAVIRTUALIZED DEVICE

(75) Inventor: Amit Shah, Pune (IN)

(73) Assignee: Red Hat, Inc., Raleigh, NC (US)

( * ) Notice: Subject to any disclaimer, the term of this patent is extended or adjusted under 35 U.S.C. 154(b) by 85 days.

(21) Appl. No.: 13/015,187

(22) Filed: Jan. 27, 2011

(65) Prior Publication Data

US 2012/0198440 A1  Aug. 2, 2012

(51) Int. Cl.
*G06F 9/455* (2006.01)
(52) U.S. Cl. ............................................ 718/1; 709/238
(58) Field of Classification Search ....... 718/1; 709/238
See application file for complete search history.

(56) References Cited

U.S. PATENT DOCUMENTS

| | | | |
|---|---|---|---|
| 2006/0070066 A1* | 3/2006 | Grobman | 718/1 |
| 2010/0306763 A1* | 12/2010 | Lambert et al. | 718/1 |
| 2011/0067105 A1* | 3/2011 | Wolfe et al. | 726/23 |
| 2012/0016973 A1* | 1/2012 | Haris et al. | 709/220 |
| 2012/0017022 A1* | 1/2012 | Corrigan et al. | 710/311 |

OTHER PUBLICATIONS

Jones, M. Tim, "Virtio: An I/O virtualization framework for Linux", Jan. 29, 2010, pp. 1-8.
Features/VirtioSerial-FedoraProject, "Virtio-Serial", last updated Feb. 8, 2010, pp. 1-5.
VMchannel Requirements-KVM, printed from the internet Aug. 3, 2010, pp. 1-4.

* cited by examiner

*Primary Examiner* — Andy Ho
(74) *Attorney, Agent, or Firm* — Lowenstein Sandler PC (57) ABSTRACT

A mechanism for communication in a virtualization system via multiple generic channels of a paravirtualized device is disclosed. A method of the invention includes creating one or more communication devices for each VM managed by a hypervisor of a host machine, exposing a plurality of ports on top of each created communication device to the VM that the communication device is associated with, specifying options for each port to enable the port to be used to establish a communication channel between the hypervisor and the VM, the options including a port name to associate with both of the port and the communication channel of the port, and creating a direct connection between two or more VMs via their associated communication devices in order to enable direct communication between the two or more VMs by utilizing the ports of their associated communication devices.

20 Claims, 4 Drawing Sheets

Fig. 1

```
┌─────────────────────────────────────────────────────────────────────┐
│ Create via emulation one or more communication devices for each VM  │
│ managed by a hypervisor                                             │
│                                                                 210 │
└─────────────────────────────────────────────────────────────────────┘
                                    │
                                    ▼
┌─────────────────────────────────────────────────────────────────────┐
│ Expose a plurality of ports of each created communication device to │
│ the VM that the communication device is associated with             │
│                                                                 220 │
└─────────────────────────────────────────────────────────────────────┘
                                    │
                                    ▼
┌─────────────────────────────────────────────────────────────────────┐
│ Specify options for each port, such as an identification number, a  │
│ name, and a device or application that the port is associated with  │
│                                                                 230 │
└─────────────────────────────────────────────────────────────────────┘
                                    │
                                    ▼
┌─────────────────────────────────────────────────────────────────────┐
│ Monitoring for data to be sent to and from the one or more          │
│ communication devices                                               │
│                                                                 240 │
└─────────────────────────────────────────────────────────────────────┘
                                    │
                                    ▼
┌─────────────────────────────────────────────────────────────────────┐
│ Dynamically adding or removing ports as necessitated by the VM      │
│                                                                 250 │
└─────────────────────────────────────────────────────────────────────┘
                                    │
                                    ▼
┌─────────────────────────────────────────────────────────────────────┐
│ Short-circuit connection between communication devices associated   │
│ with two or more VMs to enable direct communication between the two │
│ or more VMs via the ports of their communication devices            │
│                                                                 260 │
└─────────────────────────────────────────────────────────────────────┘
```

MECHANISM FOR COMMUNICATION IN A VIRTUALIZATION SYSTEM VIA MULTIPLE GENERIC CHANNELS OF A PARAVIRTUALIZED DEVICE

TECHNICAL FIELD

The embodiments of the invention relate generally to virtualization systems and, more specifically, relate to a mechanism for communication in a virtualization system via multiple generic channels of a paravirtualized device.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a hypervisor manages allocation and virtualization of computer resources and performs context switching, as may be necessary, to cycle between various VMs.

A host machine (e.g., computer or server) is typically enabled to simultaneously run multiple VMs, where each VM may be used by a local or remote client. The host machine allocates a certain amount of the host's resources to each of the VMs. Each VM is then able to use the allocated resources to execute applications, including operating systems known as guest operating systems. The hypervisor virtualizes the underlying hardware of the host machine or emulates hardware devices, making the use of the VM transparent to the guest operating system or the remote client that uses the VM.

One aspect of virtualization is the communication between a host machine and a VM that it hosts. A VM and a host machine typically rely on some type of communication mechanism to accomplish things such as seamless clipboard interaction between the VM and the host machine, communication of a VM shut down to the host machine, and communication that a VM screensaver has initialized or that a desktop in the VM is locked so that the VM can be put in sleep mode for power-saving purposes of the host machine, to name a few examples.

Conventionally, communication between a VM and a host machine was accomplished via networking. However, in some cases, there may not be a network existing between a VM and a host OS that can be used for communication purposes. In addition, there may be completely different administrators with different security protocols in place for each of the VM and the host machine so that a network setup was not possible. In other cases, hypercalls have been used to enable communications between a VM and a host machine. However, hypercalls do not provide for generic communications between a VM and a host machine and are too slow to use. They also may be architecture-dependent (architecture as in i686, x86_64, etc.). As a result, the conventional mechanisms for communication between a VM and a host machine are prone to being disabled or too limiting as to the type of information that can travel between the two entities.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide a mechanism for communication in a virtualization system via multiple generic channels of a paravirtualized device. A method of embodiments of the invention includes creating one or more communication devices for each VM managed by a hypervisor of a host machine, exposing a plurality of ports on top of each created communication device to the VM that the communication device is associated with, specifying options for each port to enable the port to be used to establish a communication channel between the hypervisor and the VM, the options including a port name to associate with both of the port and the communication channel of the port, and creating a direct connection between two or more VMs via their associated communication devices in order to enable direct communication between the two or more VMs by utilizing the ports of their associated communication devices.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "creating", "exposing", "specifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for communication in a virtualization system via multiple generic channels of a paravirtualized device. More specifically, embodiments of the invention provide a transport mechanism in a host machine for communication between the host userspace and/or kernelspace and the VM userspace and/or kernelspace. In some embodiments, the transport mechanism is a communication channel between the host machine and the VM with support for multiple ports, where stream input/output (I/O) is provided on each port. The transport mechanism of embodiments of the invention has two parts: (1) device emulation in the hypervisor that presents a device to the VM, and (2) a VM device driver that presents an interface to userspace or kernelspace applications on the VM in order to communicate with the hypervisor, to programs external to the hypervisor, and/or with other VMs.

In one embodiment, the communication channel may be virtio-based. Virtio is an abstraction over a native bus for an architecture so that virtio-based devices can be used for VM-host paravirtual communication, irrespective of the architecture of the VM or the host. For example, virtio is emulated on top of PCI on x86, whereas it uses a native bus on the s390 architecture. However, embodiments of the invention are not limited to virtio. The bus on which the emulated device resides may be implemented in any various type of specification, such as for example, Peripheral Component Interconnect (PCI).

Figure 1:
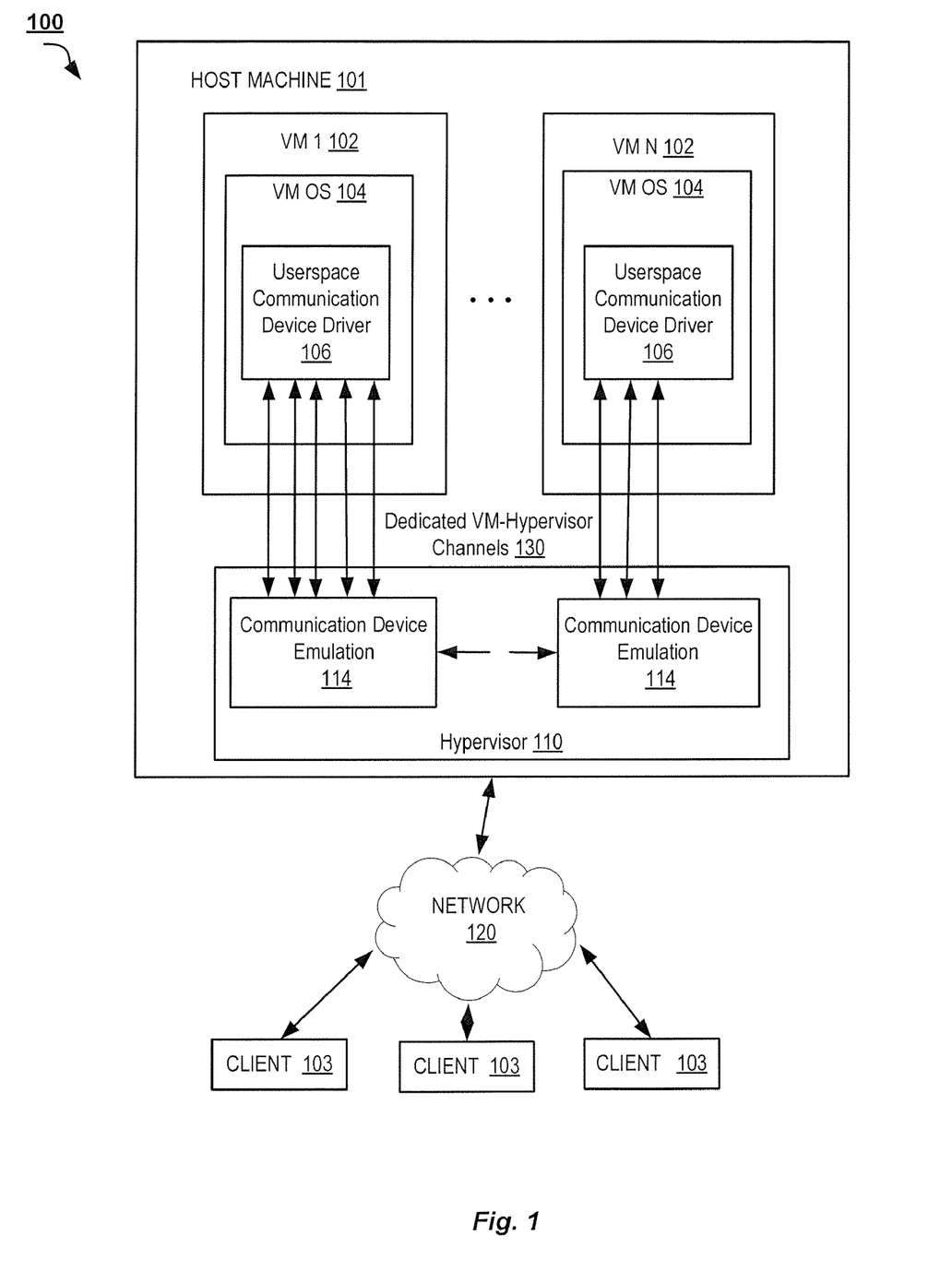
FIG. 1 is a block diagram of an exemplary virtualization architecture in which embodiments of the present invention may operate.

FIG. 1 illustrates an exemplary virtualization architecture 100 in which embodiments of the present invention may operate. The virtualization architecture 100 may include a host machine 101 coupled to one or more clients 103 over a network 120. The network 120 may be a private network (e.g., a local area network (LAN), wide area network (WAN), intranet, etc.) or a public network (e.g., the Internet). In other embodiments, the host machine 101 and clients 103 may be part of the same machine. The host 101 may be coupled to a host controller (not shown) via a network or directly. Alternatively, the host controller may be part of the host 101.

In one embodiment, the clients 103 may include computing devices that have a wide range of processing capabilities. Some or all of the clients 103 may be thin clients, which serve as access terminals for users and depend primarily on the host machine 101 for processing activities. For example, the client 103 may be a desktop computer, laptop computer, cellular phone, personal digital assistant (PDA), etc. The client 103 may run client applications such as a Web browser and a graphic user interface (GUI). The client 103 may also run other client applications to receive multimedia data streams or other data sent from the host machine 101 and re-direct the received data to a display or other user interface.

In one embodiment, the host machine 101 includes a server or a cluster of servers to run one or more VMs 102. Each VM 102 runs a guest operating system (OS) that may be different from one another. The guest OS may include Microsoft Windows, Linux, Solaris, Mac OS, etc. The host machine 101 also includes a hypervisor 110 that emulates the underlying hardware platform of the host machine 101 for the VMs 102. The hypervisor 110 may also be known as a VM monitor (VMM), a kernel-based hypervisor, or a host operating system. Each VM 102 can be accessed by one or more of the clients 103 over the network 120. In one scenario, the VM 102 can provide a virtual desktop for the client 103.

In embodiments of the invention, a transport mechanism is provided that creates a plurality of dedicated VM-hypervisor channels 130 for communication between the hypervisor 110 and the VM userspace or kernelspace of a VM OS 104. More specifically, in some embodiments, the transport mechanism may enable communication between the host machine userspace and/or kernelspace and the VM userspace and/or kernelspace. To implement the dedicated VM-hypervisor communication channels 130 of embodiments of the invention, the hypervisor 110 and VM 102 cooperate to install a paravirtualized device that enables the multiple communication channels 130 by exposing one or more ports to the VM 102.

On the hypervisor 110 side, a new communication device 114 is exposed separately for each VM 102 that the hypervisor 110 manages. This emulated communication device 114 is capable of having one or more ports whose number and purpose can be specified by an administrator of the hypervisor 110 To associate a port with a specific purpose, an administrator may provide a 'name' for the port. Then, guest applications, if they find a port name they are interested in, know which ports are meant for them. For example, in some embodiments, when a new port is added to the hardware definition of the communication device 114, the port is visible to guest applications as /dev/vport0p1, /dev/vport0p2, etc. on a first communication device 114, as /dev/vport1p1, /dev/vport1p2, etc. on a second communication device 114, and so on. Many such communication devices 114 can be added and many such ports can be added for each communication device 114 (ranging from 0->$2^{32}$-1).

The port name simplifies identification of the port on either side of the communication bridge. If the host administrator creates a new port and names it 'com.redhat.clipboard.0', guest applications can easily search for such a port and start using it if it exists. The name chosen can be generic (like 'clipboard') or very specific, like 'com.redhat.clipboard.0'. The communication device 114 is responsible for exposing itself to its associated VM 102, enumerating and placing multiple ports on top of itself, accepting and passing on data coming into device 114, and collecting and sending out data to the VM 102.

On the VM 102 side, a userspace communication device driver 106 is installed to enable the emulated communication device 114 with respect to the VM 102. The device driver 106 presents an interface to VM OS userspace applications. The VM 102 will then see a communication device 114 with multiple ports. This may be in response to installation of the device driver 106, the boot up process of the VM 102, or a hot plug of the communication device 114, to name a few examples.

In some embodiments, the number of ports on the communication device 114 can be dynamically increased or decreased depending on the needs of the VM 102. For instance, hot plug and hot unplug of ports may be supported with the emulated communication device 114 of embodiments of the invention. In addition, the device 114 itself can be hot-plugged/unplugged. Furthermore, more than one communication device 114 can be emulated on the hypervisor 110 for a particular VM 102. This may be in the case where the number of ports on a single communication device 114 is limited and more ports are desired for use by a VM 102.

In one embodiment, each communication channel 130 enabled by the communication device 114 of embodiments of the invention is a simple byte-based channel between the VM 102 and hypervisor 110. As such, there is no need for interpretation of data that flows across the channel, and the hypervisor 110 does not have to interpret the data it receives via any of the channels 130 unless the hypervisor 110 wants to consume the data exclusively or in addition to an external program.

In addition, each communication channel implemented through the ports of the communication device 114 may be associated with a particular function or application of the VM 102 and hypervisor 110. Initially, all ports are generic and the data that flows over all ports can be the same. Only applications on either side of the port can make sense of the data. Port names are not mandatory, but they can provide identifying information for the data following through the port. The port name may help applications on either side of the port to possibly identify the type of data flowing through the port. Programs internal and external to the hypervisor 110 may want to interact with the VM 102, and each of these programs can be assigned a communication port/channel to achieve its communications with embodiments of the invention. For instance, ports (and their associated communication channel) may be used for clipboard copy/paste support between the hypervisor 110 and the VM 102, libguestfs to probe which file system the VM 102 uses and which application are installed, Anaconda installation logs could be sent to the hypervisor 110 for messages that are emitted before networking is setup, locking the VM 102 screen in case of the VNC session to the VM being closed, notification of VM start-up and shutdown, and so on.

In embodiments of the invention, the port number of a port is not associated with the 'purpose' of a port. Rather, port numbers can dynamically vary between VM invocations. A purpose of a port is only hinted by the port's name.

In one embodiment, one port/channel of the communication device 114 is reserved specifically for communications between the device driver 106 on the VM 102 and the device itself 114 on the hypervisor 110. For example, when a new port is hot plugged on the device 114, any communications regarding this would be over this special dedicated channel 130. This is one example of a port that communicates between host and guest kernel. Another example is a console device, which can present the guest console to the host (allowing someone to login to the guest over the console port, capture guest kernel messages, etc.).

In further embodiments of the invention, the communication device 114 may enable VM-to-VM communication via the host machine 101. This VM-to-VM communication with the multiple generic communication channels may be implemented by replaying information from/to the VM 102 to another VM 102. Depending on the host machine's 101 role, direct VM-to-VM communication is made possible if the hypervisor 110 is not involved beyond replaying information. For instance, in the case of VM1 102 and VM 2 102 communicating, the hypervisor 110 connects to both VMs 102, and short-circuits the connections on the host side so that whatever VM1 writes to the communications device 114 is seen by the host as well as by VM 2 and vice-versa.

If the host machine 110 participates in the information flow between VMs 102, then the hypervisor 102 can multicast or broadcast information to multiple VMs 102 at once. For instance, if the host machine 101 is going down for maintenance, then shutdown requests may be sent to the multiple VMs 102 at the same time. Another example may be when the hypervisor 110 needs to receive information from multiple VMs in order to finish an operation. For instance, in a migration process of multiple VMs 102, the hypervisor 110 may need to receive an OK to migrate from each of the VMs 102 when the have stopped using the disk in order to provide consistency. In yet another example, the host may take certain actions by monitoring the information flowing between multiple VMs.

Figure 2:
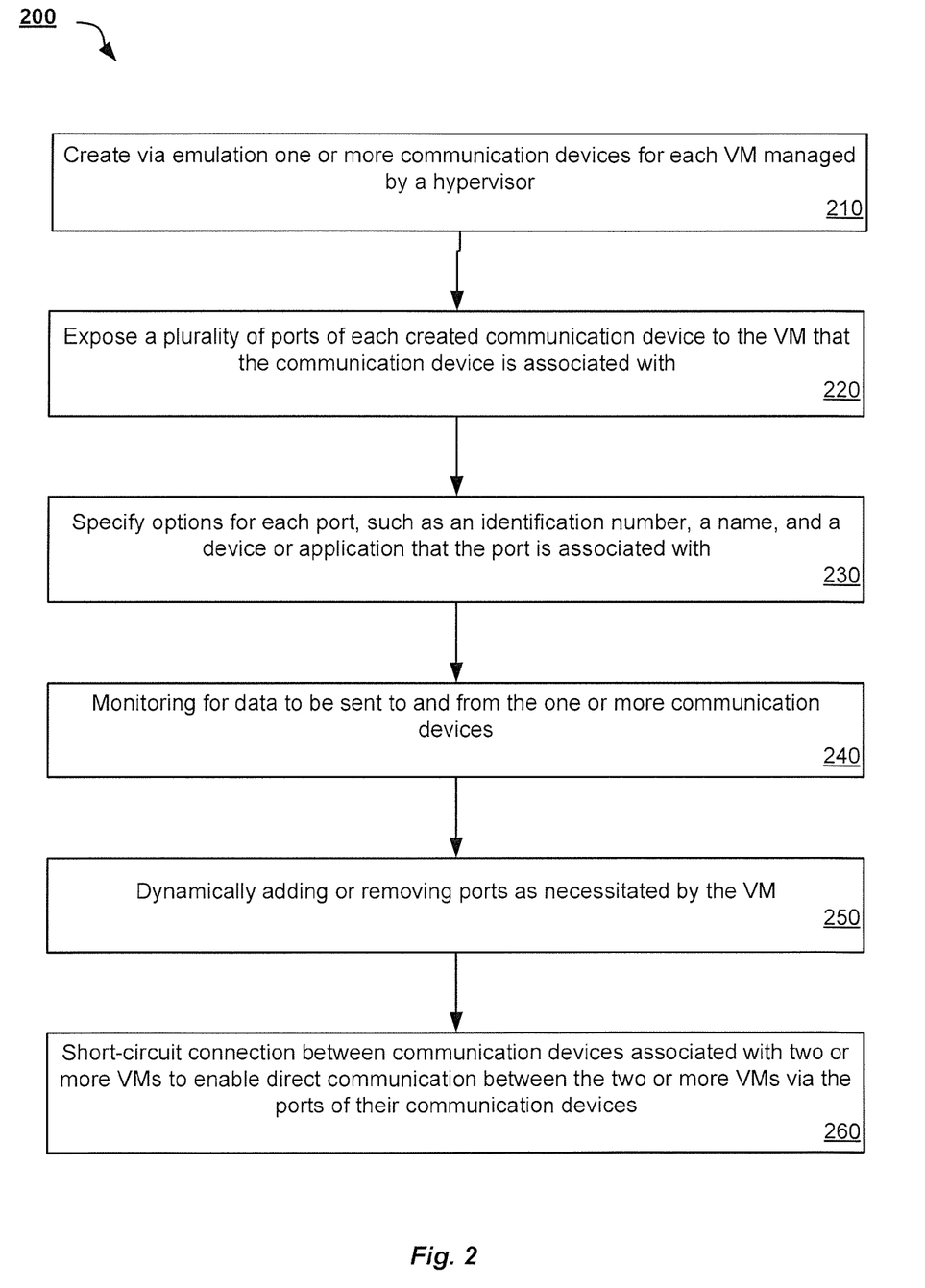
FIG. 2 is a flow diagram illustrating a method performed by a hypervisor for communication in a virtualization system via multiple generic channels of a paravirtualized device according to an embodiment of the invention.

FIG. 2 is a flow diagram illustrating a method 200 performed by a hypervisor for communication in a virtualization system via multiple generic channels of a paravirtualized device according to an embodiment of the invention. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 is performed by hypervisor 110 of FIG. 1.

Method 200 begins at block 210 where one or more communication devices are created for each VM managed by the hypervisor. The creation of these communication devices is accomplished via emulation by the hypervisor. In one embodiment, the one or more communication devices are virtio devices. At block 220, a plurality of ports on each communication device are exposed to the VM that the communication device is associated with. In one embodiment, to expose the plurality of ports to the VM, the hypervisor creates the ports on the communication device with a command line to instantiate each port, and thereafter the port will be visible by the VM. In some embodiments, a more higher-level tool, such as virt-manager, may expose a graphical interface to add ports. Alternatively, ports may be added implicitly by initializing a new device type that uses such ports, e.g., a clipboard communication port.

Subsequently, at block 230, options for each exposed port are specified. In one embodiment, each port is given a name that is useful for VM applications that are trying to discover the ports of their interest. For example, on Linux, ports are visible and identified by their name in the /dev/virtio-ports/ directory. On the current Windows guest driver implementation, an interface to the driver is provided. This interface may be queried to find out if a particular named port exists. In other embodiments, each port is given an identification number for enumeration within the hypervisor, which is useful for hot-plug/unplug operations and migration. In yet other embodiments, the port is given an extra parameter that specifies the host machine-side device or application that the port is associated with. For instance, in a Linux kernel-based hypervisor, this extra parameter may specify the host machine-side qemu chardev that the port is associated with for I/O purposes.

At block 240, the one or more created communications devices are monitored for data to be sent to and from these communication devices. Programs internal and external to the hypervisor may want to interact with the VM. As such, the hypervisor is responsible for accepting and passing on data coming into the communication devices and collecting and sending out data to the VM from the communication devices. At block 250, additional ports are added or removed dynamically as necessitated by the VM. For instance, if an additional program or device is identified as needing communication with the hypervisor, another port may be added on-the-fly to the communication device.

Lastly, at block 260, VM-to-VM communication is enabled via the communication devices associated with the VMs seeking to communicate with one another. In one embodiment, a connection between communication devices for two or more VMs is short-circuited in order to enable the direct communication between the two or more VMs. Once the connection is established, the VMs may communicate via the ports of their associated communication devices by the hypervisor replaying communications to the other VM. In some cases, the hypervisor may utilize the VM-to-VM communication to multicast or broadcast information for the hypervisor's own purposes, as well as to receive information from multiple guests related to a single operation of the hypervisor.

Figure 3:
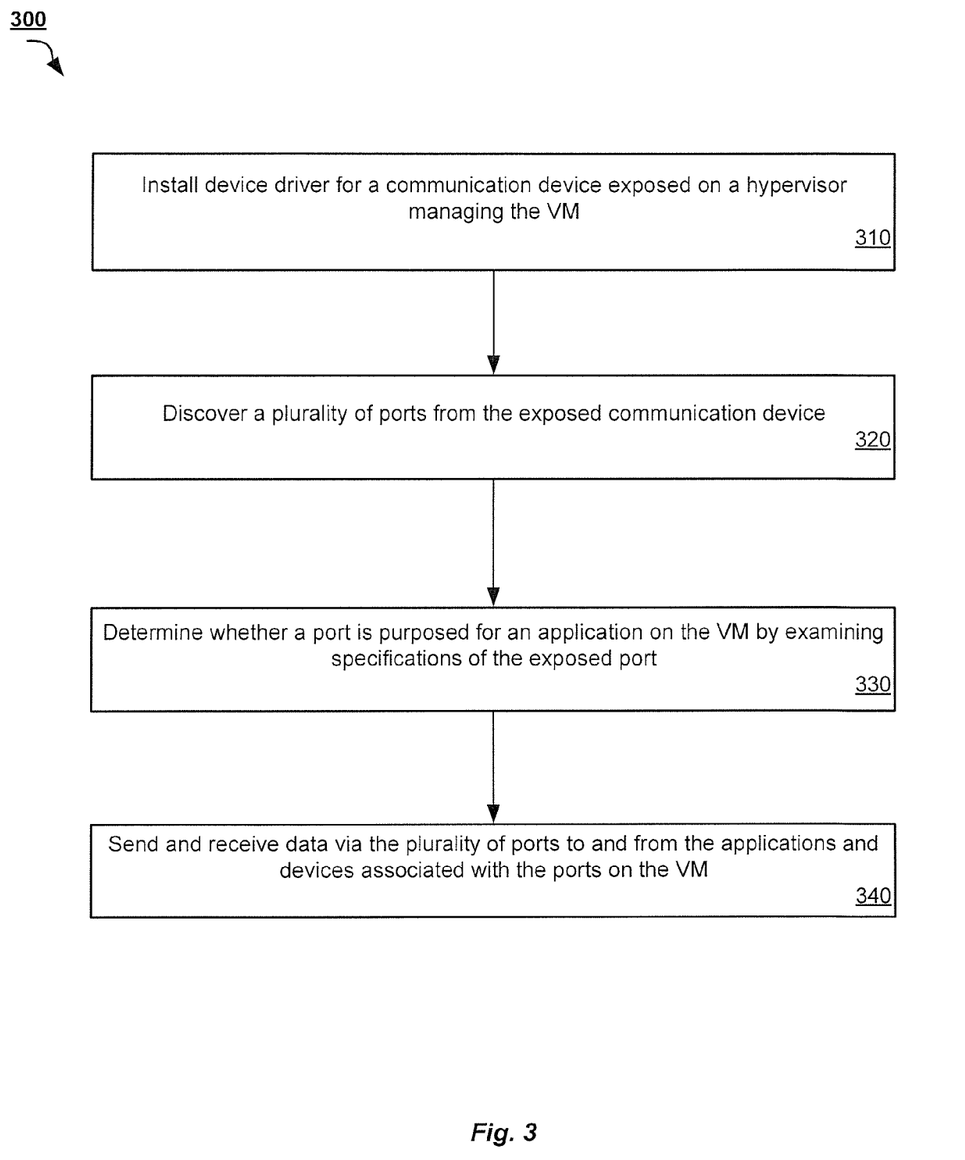
FIG. 3 is a flow diagram illustrating a method performed by a VM for communication in a virtualization system via multiple generic channels of a paravirtualized device according to an embodiment of the invention.

FIG. 3 is a flow diagram illustrating a method 300 performed by a VM for communication in a virtualization system via multiple generic channels of a paravirtualized device according to an embodiment of the invention. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by VM 102 of FIG. 1.

Method 300 begins at block 310 where a device driver is installed for a communication device that is exposed by a hypervisor that manages the VM. The communication device on the hypervisor is solely associated with the VM, and there may be multiple such communication devices on the hypervisor for each VM it manages. The installation of the device driver is not necessary each time the VM is started, but just once. In many cases, the VM device driver will be available as part of the VM itself. At block 320, a plurality of ports from the exposed communication device are discovered via the device driver. In one embodiment, the hypervisor creates the ports on the communication device with a command line to instantiate each port, and thereafter the port will be visible to the VM. Ports can also be created by sending commands to a running hypervisor instance, which hot-plugs devices and ports.

At block 330, the VM determines whether a port is purposed for an application of the VM and/or device of the VM by examining specifications of the exposed port. This process may occur whenever a new port is discovered. In some embodiments, this can happen each time a VM is started and the device driver for the device is loaded, when a device is hot-plugged, or when a port is hot-plugged. In other embodiments, the port number—port name mapping is looked up when a request to fetch the port number associated with a particular port name is received. The VM application can then open the port using the port number information. In one embodiment, each VM application itself can determine if ports they are interested in exist, and if they do, then these VM applications may start using these ports. Lastly, at block 340, the VM sends and receives data via the plurality of ports to and from the VM applications and devices associated with the ports.

Figure 4:
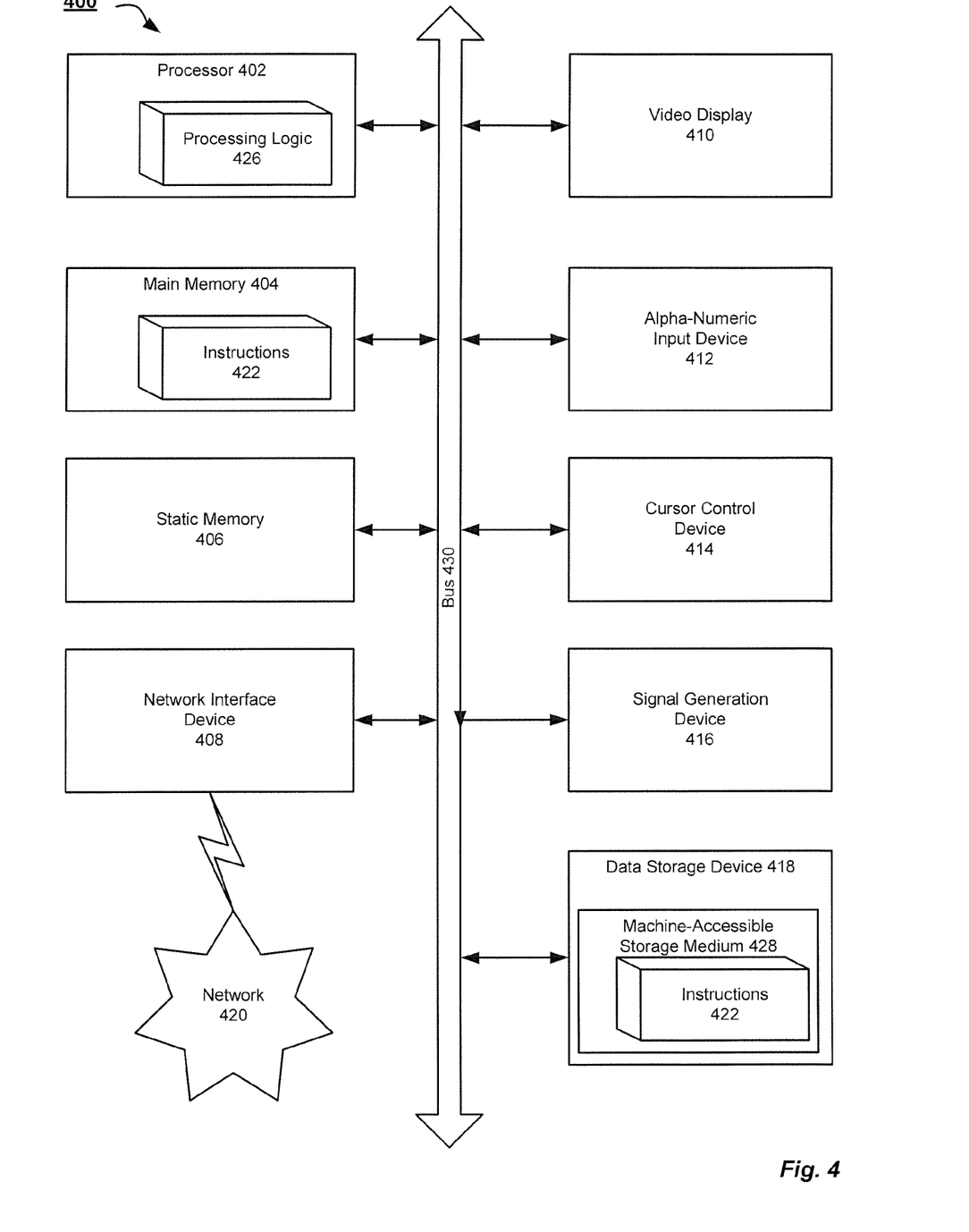
FIG. 4 illustrates a block diagram of one embodiment of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428 on which is stored one or more set of instructions (e.g., software 422) embodying any one or more of the methodologies of functions described herein. For example, software 422 may store instructions to perform communication in a virtualization system via multiple generic channels of a paravirtualized device by host machine 100 described with respect to FIG. 1. The software 422 may also reside, completely or at least partially, within the main memory 404 and/or within the processing device 402 during execution thereof by the computer system 400; the main memory 404 and the processing device 402 also constituting machine-accessible storage media. The software 422 may further be transmitted or received over a network 420 via the network interface device 408.

The machine-readable storage medium 428 may also be used to store instructions to perform methods 200 and 300 for communication in a virtualization system via multiple generic channels of a paravirtualized device described with respect to FIGS. 2 and 3, and/or a software library containing methods that call the above applications. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method, comprising:
creating, by a hypervisor of a host machine, one or more communication devices for each virtual machine (VM) managed by the hypervisor;
exposing, by the hypervisor, a plurality of ports on top of each created communication device to the VM that the communication device is associated with;
specifying, by the hypervisor, options for each port to enable the port to be used to establish a communication channel between the hypervisor and the VM, the options including a port name to associate with the port; and
creating, by the hypervisor, a direct connection between two or more VMs via their associated communication devices in order to enable direct communication between the two or more VMs by utilizing the ports of their associated communication devices.

2. The method of claim 1, further comprising monitoring for data to be sent to and from the one or more communication devices.

3. The method of claim 1, further comprising at least one of dynamically adding or removing ports from a communication device of the one or more communication devices as necessitated by the VM associated with the communication device.

4. The method of claim 1, wherein the communication device resides on a virtio bus.

5. The method of claim 1, wherein the application to be associated with the port includes at least one of clipboard copy/paste support, keyboard or mouse events, libguestfs, Anaconda logs, locking of the VM screen, and notification of VM start-up and shutdown.

6. The method of claim 1, wherein the hypervisor utilizes the direct connection between the two or more VMs to at least one of multicast or broadcast information to the two or more VMs.

7. The method of claim 1, wherein the VM includes a device driver associated with the one or more communication devices associated with the VM, the device driver to enable communication over the plurality of ports of one or more communication device to the hypervisor.

8. The method of claim 1, wherein the options for each port include at least one of each a name of the port, an identification number of the port for enumeration within the hypervisor, or an extra parameter that specifies the host machine-side device or application that the port is associated with.

9. A system, comprising:
a processing device;
a memory communicably coupled to the processing device; and
a hypervisor to execute one or more virtual machines (VMs) from the memory that share use of the processing device, the hypervisor configured to:
create one or more communication devices for each VM managed by the hypervisor;
expose a plurality of ports on top of each created communication device to the VM that the communication device is associated with;
specify options for each port to enable the port to be used to establish a communication channel between the hypervisor and the VM, the options including a port name to associate with the port; and
create a direct connection between two or more VMs via their associated communication devices in order to enable direct communication between the two or more VMs by utilizing the ports of their associated communication devices.

10. The system of claim 9, wherein the hypervisor further configured to monitor for data to be sent to and from the one or more communication devices.

11. The system of claim 9, wherein the hypervisor further configured to at least one of dynamically add or remove ports from a communication device of the one or more communication devices as necessitated by the VM associated with the communication device.

12. The system of claim 9, wherein the communication device resides on a virtio bus.

13. The system of claim 9, wherein the hypervisor further configured to utilize the direct connection between the two or more VMs to at least one of multicast or broadcast information to the two or more VMs.

14. The system of claim 9, wherein the VM includes a device driver associated with the one or more communication devices associated with the VM, the device driver to enable communication over the plurality of ports of one or more communication device to the hypervisor.

15. The system of claim 9, wherein the options for each port include at least one of each a name of the port, an identification number of the port for enumeration within the hypervisor, or an extra parameter that specifies the host machine-side device or application that the port is associated with.

16. A non-transitory machine-readable storage medium including data that, when accessed by a machine, cause the machine to perform operations comprising:
   creating one or more communication devices for each virtual machine (VM) managed by a hypervisor of a host machine;
   exposing a plurality of ports on top of each created communication device to the VM that the communication device is associated with;
   specifying options for each port to enable the port to be used to establish a communication channel between the hypervisor and the VM, the options including a port name to associate with the port; and
   creating a direct connection between two or more VMs via their associated communication devices in order to enable direct communication between the two or more VMs by utilizing the ports of their associated communication devices.

17. The non-transitory machine-readable storage medium of claim 16, wherein the non-transitory machine-readable storage medium includes data that, when accessed by the machine, cause the machine to perform further operations comprising at least one of dynamically adding or removing ports from a communication device of the one or more communication devices as necessitated by the VM associated with the communication device.

18. The non-transitory machine-readable storage medium of claim 16, wherein the hypervisor utilizes the direct connection between the two or more VMs to at least one of multicast or broadcast information to the two or more VMs.

19. The non-transitory machine-readable storage medium of claim 16, wherein the VM includes a device driver associated with the one or more communication devices associated with the VM, the device driver to enable communication over the plurality of ports of one or more communication device to the hypervisor.

20. The non-transitory machine-readable storage medium of claim 16, wherein the options for each port include at least one of each a name of the port, an identification number of the port for enumeration within the hypervisor, or an extra parameter that specifies the host machine-side device or application that the port is associated with.

* * * * *